(12) United States Patent
Thubert et al.

(10) Patent No.: US 11,863,348 B2
(45) Date of Patent: Jan. 2, 2024

(54) MESSAGE HANDLING BETWEEN DOMAINS

(71) Applicant: Cisco Technology, Inc., San Jose, CA (US)

(72) Inventors: Pascal Thubert, Roquefort les Pins (FR); Amine Choukir, Lausanne (CH); Domenico Ficara, Essertines-sur-Yverdon (CH); Eric M. Levy-Abegnoli, Valbonne (FR); Bhavik Fajalia, Bangalore (IN); Gokul Bhoothanathan Kailasanatha Subramania, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/368,595

(22) Filed: Jul. 6, 2021

(65) Prior Publication Data
US 2023/0009229 A1    Jan. 12, 2023

(51) Int. Cl.
*H04L 12/46* (2006.01)
*H04L 67/563* (2022.01)

(52) U.S. Cl.
CPC ...... *H04L 12/4633* (2013.01); *H04L 12/4641* (2013.01); *H04L 67/563* (2022.05)

(58) Field of Classification Search
CPC ........................ H04L 12/4633; H04L 12/4641; H04L 67/563
See application file for complete search history.

(56) References Cited

U.S. PATENT DOCUMENTS

| | | | | |
|---|---|---|---|---|
| 9,578,069 | B1 * | 2/2017 | Beech | H04L 65/80 |
| 9,848,399 | B2 * | 12/2017 | Roeland | H04W 60/00 |
| 10,880,162 | B1 * | 12/2020 | Hankins | H04L 41/0813 |
| 2003/0176188 | A1 * | 9/2003 | O'Neill | H04L 63/08 |
| | | | | 455/433 |
| 2004/0213181 | A1 * | 10/2004 | Grech | H04W 40/00 |
| | | | | 709/242 |
| 2006/0002356 | A1 | 1/2006 | Barany et al. | |
| 2007/0070946 | A1 * | 3/2007 | Dorenbosch | H04L 12/185 |
| | | | | 370/331 |

(Continued)

FOREIGN PATENT DOCUMENTS

WO    2019083340 A1    5/2019

OTHER PUBLICATIONS

IP.com PAD, "Location Based Bridging of Link Local Traffic For A Roamed Client," Publication Date Jul. 23, 2013 [Abstract Only].

*Primary Examiner* — Blake J Rubin
(74) *Attorney, Agent, or Firm* — Patterson + Sheridan, LLP

(57) ABSTRACT

A method includes receiving, at a home controller of a home domain and from a first device in the home domain, a first message concerning a user device that is anchored to the home domain and that has roamed from the home domain to a visitor domain. The method also includes, in response to determining that the first device is a router, opening a tunnel between the home controller and a visitor controller of the visitor domain and communicating the first message to the user device through the tunnel. The method further includes receiving, at the home controller and from a second device in the home domain, a second message concerning the user device and in response to determining that the second device is not a router, communicating, to the second device, a proxy response to the second message.

17 Claims, 8 Drawing Sheets

(56) References Cited

U.S. PATENT DOCUMENTS

| | | | |
|---|---|---|---|
| 2007/0086458 A1* | 4/2007 | Narayanan | H04L 12/185 370/432 |
| 2007/0201469 A1* | 8/2007 | Iyer | H04L 61/103 370/395.52 |
| 2007/0232301 A1* | 10/2007 | Kueh | H04W 8/082 455/433 |
| 2008/0002607 A1* | 1/2008 | Nagarajan | H04W 8/087 370/328 |
| 2008/0072301 A1* | 3/2008 | Chia | H04L 63/0815 726/8 |
| 2008/0176560 A1* | 7/2008 | Dutta | H04W 12/062 455/433 |
| 2008/0270525 A1* | 10/2008 | Thero | G06F 3/1228 709/203 |
| 2008/0310323 A1 | 12/2008 | Shirota et al. | |
| 2009/0168698 A1* | 7/2009 | Weniger | H04W 8/16 370/328 |
| 2009/0268664 A1* | 10/2009 | Hirano | H04W 8/082 370/328 |
| 2009/0313680 A1* | 12/2009 | Hirano | H04L 63/104 726/3 |
| 2010/0046524 A1* | 2/2010 | Rune | H04L 12/4633 370/395.53 |
| 2010/0067446 A1* | 3/2010 | Oulai | H04W 8/082 370/329 |
| 2010/0189000 A1* | 7/2010 | Hirano | H04L 63/12 370/252 |
| 2010/0202383 A1* | 8/2010 | Sugimoto | H04W 12/062 370/329 |
| 2010/0241862 A1* | 9/2010 | Garcia Morchon | H04L 63/061 713/171 |
| 2011/0051725 A1* | 3/2011 | Janneteau | H04L 12/18 370/390 |
| 2011/0090842 A1* | 4/2011 | Hirano | H04L 63/12 370/328 |
| 2011/0093919 A1* | 4/2011 | Naslund | H04W 12/06 455/411 |
| 2011/0103284 A1* | 5/2011 | Gundavelli | H04W 40/30 370/312 |
| 2011/0103344 A1* | 5/2011 | Gundavelli | H04W 8/005 370/331 |
| 2011/0122815 A1* | 5/2011 | Velev | H04W 8/082 370/328 |
| 2011/0299548 A1* | 12/2011 | Chen | H04L 12/1453 370/401 |
| 2012/0204224 A1* | 8/2012 | Wang | H04L 67/63 726/3 |
| 2012/0259992 A1* | 10/2012 | Koehler | H04W 12/06 709/229 |
| 2012/0314601 A1* | 12/2012 | Wang | H04W 8/12 370/252 |
| 2013/0028163 A1* | 1/2013 | Hsiao | H04W 4/06 370/312 |
| 2013/0230021 A1* | 9/2013 | Zuniga | H04W 36/12 370/328 |
| 2013/0305332 A1* | 11/2013 | Narasimhan | H04W 36/0038 726/7 |
| 2013/0329746 A1* | 12/2013 | Palacios Valverde | H04L 49/351 370/401 |
| 2013/0343304 A1* | 12/2013 | Kaippallimalil | H04W 12/069 370/329 |
| 2014/0280938 A1* | 9/2014 | Kadaba | H04L 12/4633 709/225 |
| 2014/0347976 A1* | 11/2014 | Keesara | H04L 45/586 370/219 |
| 2015/0036535 A1* | 2/2015 | Mosko | H04L 45/02 370/254 |
| 2015/0181394 A1* | 6/2015 | Zuniga | H04W 4/06 370/312 |
| 2015/0249999 A1* | 9/2015 | Kaippallimalil | H04W 72/085 370/329 |
| 2015/0378658 A1* | 12/2015 | Mandigo | H04L 67/51 358/1.15 |
| 2016/0036773 A1* | 2/2016 | Luo | H04L 61/103 370/392 |
| 2016/0198501 A1* | 7/2016 | Verkaik | H04W 8/04 370/329 |
| 2016/0337272 A1* | 11/2016 | Berman | H04L 49/70 |
| 2017/0149614 A1* | 5/2017 | Zheng | H04L 61/103 |
| 2017/0230230 A1* | 8/2017 | Theogaraj | H04L 45/00 |
| 2017/0339099 A1* | 11/2017 | Levy-Abegnoli | H04L 67/52 |
| 2018/0227969 A1* | 8/2018 | Verkaik | H04W 8/082 |
| 2018/0337831 A1* | 11/2018 | Grill | H04W 12/37 |
| 2019/0306772 A1* | 10/2019 | Othman | H04W 36/0016 |
| 2020/0329364 A1* | 10/2020 | Foti | H04W 8/18 |
| 2021/0168132 A1* | 6/2021 | Smith | H04L 63/0884 |
| 2023/0045195 A1* | 2/2023 | Abtin | H04L 65/1095 |

\* cited by examiner

MESSAGE HANDLING BETWEEN DOMAINS

TECHNICAL FIELD

Embodiments presented in this disclosure generally relate to message handling. More specifically, embodiments disclosed herein relate message handling across network domains.

BACKGROUND

Network implementations in large spaces (e.g., office buildings) may divide the spaces into different network domains (e.g., level 3 domains) based on physical location. This division allows for more devices to operate concurrently within the spaces. When a device first connects to the network, however, the device is anchored to the domain through which the device first connected (also referred to as a "home domain"). If the device were to move or roam to another portion of the space covered by a different domain (also referred to as a "visited domain"), the device connects to that domain but remains anchored to its home domain. As a result, when the device sends or receives link local traffic, the packets are sent to the home domain controller, which prevents the device from discovering services or other devices in the visited domain.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
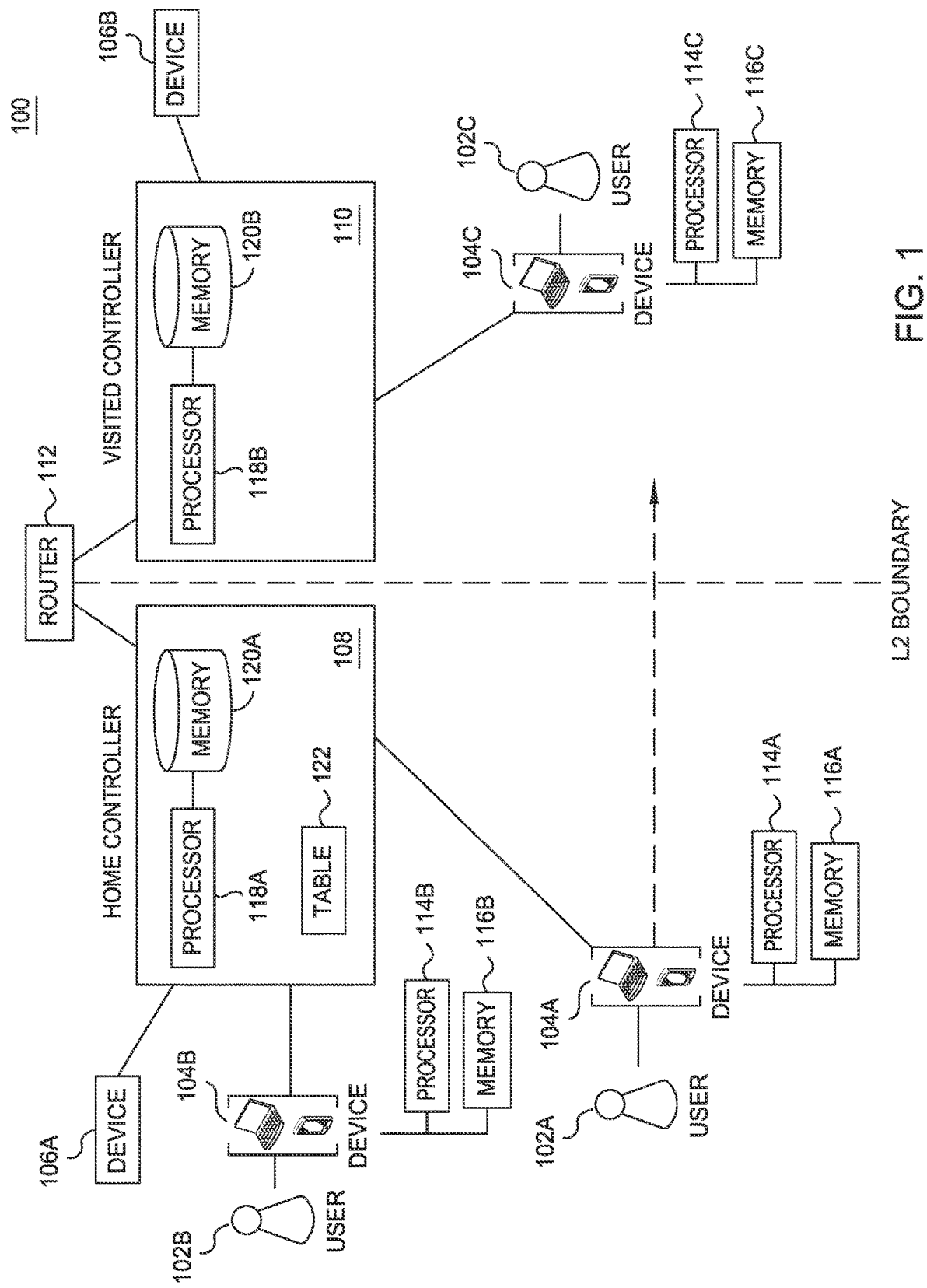
FIG. 1 illustrates an example system.

According to an embodiment, a method includes receiving, at a home controller of a home domain and from a first device in the home domain, a first message concerning a user device that is anchored to the home domain and that has roamed from the home domain to a visitor domain. The method also includes, in response to determining that the first device is a router, opening a tunnel between the home controller and a visitor controller of the visitor domain and communicating the first message to the user device through the tunnel. The method further includes receiving, at the home controller and from a second device in the home domain, a second message concerning the user device and in response to determining that the second device is not a router, generating a response to the second message and communicating, to the second device, the response to the second message as a proxy for the user device. Other embodiments include an apparatus that performs this method.

According to another embodiment, a method includes in a first device roaming in a visited domain, receiving a message from a second device in a home domain and communicating, to the second device, a response to the message. The message and the response are communicated through a tunnel between a controller in the visited domain and a controller in the home domain. Other embodiments include an apparatus that performs this method.

Example Embodiments

This disclosure describes a message handling scheme that allows devices that have roamed to a different level 3 domain (e.g., a visited domain) to discover other devices and services in that domain while remaining anchored to an original level 3 domain (e.g., a home domain). Generally, a controller in the home domain (e.g., a home controller) generates proxy responses to defend the link local address of the device so that the device's link local address is not overwritten in the home domain. The device also defends its link local address in the visited domain so that the device retains its link local address in the visited domain. The controllers in the home domain and the visited domain retain messages with link local addresses in their respective domains except when the messages originated from or are intended for certain networking services (e.g., routers and dynamic host configuration protocol (DHCP) relays). For example, if the home controller receives a message for the device from a router in the home domain when the device is in the visited domain, the controller opens a tunnel to the visited domain and communicates the message to the device through the tunnel. The device can then respond to that message through the tunnel. As another example, if a printer in the visited domain communicates a message with the link local address of the device, the controller in the visited domain (e.g., visited controller) retains that message in the visited domain. In this manner, the device can discover services and devices in the visited domain but continue to interact with networking services (e.g., routers and DHCP) in the home domain.

FIG. 1 illustrates an example system 100. As seen in FIG. 1, the system 100 includes one or more devices 104, one or more devices 106, a home controller 108, a visited controlled 110, and a router 112. Generally, the system 100 is divided into different level 3 domains that are serviced by the home controller 108 and the visited controller 110. The home controller 108 services a home domain and the visited controller 110 services a visited domain. The router 112 services the home controller 108 and the visited controller 110 and forms a level 2 boundary that divides the two domains. Each of the devices 104 and 106 may connect to the home controller 108 or the visited controller 110 to receive access to a network. In particular embodiments, the home controller 108 and the visited controller 110 allow a device 104 to discover devices and services in one domain while remaining anchored to the other domain.

Each of the domains in the system 100 may cover a different location. For example, the system 100 may be implemented in a large office building. The home controller 108 and the visited controller 110 may be positioned on different floors of the office building and provide service to those floors. As a result, the home domain and the visited domain may cover different floors of the office building. As another example, the system 100 may be implemented in a large auditorium or conference space. The home controller 108 and the visited controller 110 may be positioned in different areas of the space. The home domain and the visited domain may then cover different areas of the space.

A user 102 may use the device 104 to connect to the home controller 108 and/or the visited controller 110 to gain access to a network. In the example of FIG. 1, the system 100 includes a device 104A, a device 104B, and a device 104C. The device 104A and the device 104B are connected to the home controller 108. The device 104C is connected to the visited controller 110. The devices 104A and 104B may be positioned in an area that is serviced by the home controller 108. Thus, the devices 104A and 104B are in the home domain. The device 104C may be in an area that is serviced by the visited controller 110. Thus, the device 104C is in the visited domain. Each of the devices 104 may be anchored to the controller 108 or 110 or domain to which the device 104 first connects. If the device 104 then moves or roams to another domain, the device 104 remains anchored to the domain to which the device 104 first connected. Each of the devices 104 includes a processor 114 and a memory 116, which are configured to perform any of the functions or actions of the device 104 described herein. The device 104A includes a processor 114A and a memory 116A. The device 104B includes a processor 114B and a memory 116B. The device 104C includes a processor 114C and a memory 116C.

The device 104 is any suitable device for communicating with components of the system 100. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The processor 114 is any electronic circuitry, including, but not limited to one or a combination of microprocessors, microcontrollers, application specific integrated circuits (ASIC), application specific instruction set processor (ASIP), and/or state machines, that communicatively couples to memory 116 and controls the operation of the device 104. The processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 114 may include other hardware that operates software to control and process information. The processor 114 executes software stored on the memory 116 to perform any of the functions described herein. The processor 114 controls the operation and administration of the device 104 by processing information (e.g., information received from the devices 106, controllers 108 or 110, and memory 116). The processor 114 is not limited to a single processing device and may encompass multiple processing devices.

The memory 116 may store, either permanently or temporarily, data, operational software, or other information for the processor 114. The memory 116 may include any one or a combination of volatile or non-volatile local or remote devices suitable for storing information. For example, the memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 116, a disk, a CD, or a flash drive. In particular embodiments, the software may include an application executable by the processor 114 to perform one or more of the functions described herein.

The devices 106 are any suitable device that can connect to the home controller 108 or the visited controller 110. For example, the devices 106 may be printers, routers, servers, relays, gateways, scanners, or any other network device. The devices 106 connect to the home controller 108 and/or the visited controller 110 to provide services to other devices 104 in the system 100. In the example of FIG. 1, the device 106A is connected to the home controller 108, and the device 106B is connected to the visited controller 110. Thus, the device 106A is in the home domain and the device 106B is in the visited domain. The devices 104A and 104B may transmit messages to and/or receive messages from the device 106A to receive services from the device 106A. The device 104C may transmit messages to or receive messages from the device 106B to receive services from the device 106B. For example, if the device 106 is a printer, then the devices 104 may communicate messages to and from the device 106 to print a document using the device 106. As another example, if the device 106 is a router, then the devices 104 may respond to requests from the device 106 to prevent the device 106 from assigning an address of the device 104 to another device.

The home controller 108 is a wireless controller (e.g., WLAN controller) that services the home domain. The home controller 108 may service any suitable number of devices 104 or 106 in the home domain. As seen in FIG. 1, the home controller 108 includes a processor 118A and a memory 120A, which are configured to perform any of the functions or actions of the home controller 108 described herein. The visited controller 110 is a wireless controller that services the visited domain. Any suitable number of devices 104 or 106 may connect to the visited controller 110. As seen in FIG. 1, the visited controller 110 includes a processor 118B and a memory 120B, which are configured to perform any of the functions or actions of the visited controller 110 described herein.

The processor 118 is any electronic circuitry, including, but not limited to one or a combination of microprocessors, microcontrollers, application specific integrated circuits (ASIC), application specific instruction set processor (ASIP), and/or state machines, that communicatively couples to memory 120 and controls the operation of the controller 108 or 110. The processor 118 may be 8-bit, 16-bit, 32-bit, 64-bit or of any other suitable architecture. The processor 118 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 118 may include other hardware that operates software to control and process information. The processor 118 executes software stored on the memory 120 to perform any of the functions described herein. The processor 118 controls the operation and administration of the controller 108 or 110 by processing information (e.g., information received from the devices 104, devices 106, and memory 120). The processor 118 is not limited to a single processing device and may encompass multiple processing devices.

The memory 120 may store, either permanently or temporarily, data, operational software, or other information for the processor 118. The memory 120 may include any one or a combination of volatile or non-volatile local or remote devices suitable for storing information. For example, the memory 120 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 120, a disk, a CD, or a flash drive. In particular embodiments, the software may include an application executable by the processor 118 to perform one or more of the functions described herein.

The router 112 services the home controller 108 and the visited controller 110 and allows the home controller 108 and the visited controller 110 to communicate with each other through the router 112 (e.g., by opening a communication tunnel). The router 112 represents the level 2 boundary between the home domain and the visited domain. The router 112 may maintain certain state information about the home domain, the home controller 108, the visited domain, and the visited controller 110. The router 112 may not be the same as the devices 106 that are assigned to the home domain or the visited domain, even though the devices 106 may themselves be routers.

In the example of FIG. 1, the user 102A using the device 104A moves from an area serviced by the home controller 108 to an area serviced by the visited controller 110. For example, the user 102A may have moved to a different floor in an office building or to a different area of a conference space. As a result, the user 102A and the device 104A move from the home domain to the visited domain. The device 104A shifts its connection from the home controller 108 to the visited controller 110. A primary controller (not illustrated) may track the domain and/or controller to which the device 104A is connected.

Even though the device 104A moves from the home domain to the visited domain, the device 104A remains anchored to the home domain. For example, the home controller 108 may maintain a table 122 that stores addresses of the device 104A, such as a link local address of the device 104A in the home domain (e.g., a home domain address) and/or a global address of the device 104A. The global address of the device 104 is unique to the device 104 within the system 100. The global address may be used to identify or locate the device 104 regardless of which domain the device 104 is located. As a result, even though the device 104A shifts its connection from the home controller 108 to the visited controller 110, the device 104A is still considered anchored to the home controller 108 and the home domain.

The home controller 108 and the visited controller 110 implement a message handling scheme that protects the link local addresses of devices 104 that are anchored to the home domain and the visited domain, respectively. In this manner, even if a device 104 roams to another domain, the device 104 may maintain its link local address. Additionally, the home controller 108 and the visited controller 110 retain messages with link local addresses in their respective domains, except messages that are intended for or are communicated by certain networking services (e.g., routers and DHCP). In this manner, a device 104 that has roamed to a visited domain can discover other devices 106 and services in the visited domain while continuing to interact with networking services in the home domain.

Figure 2:
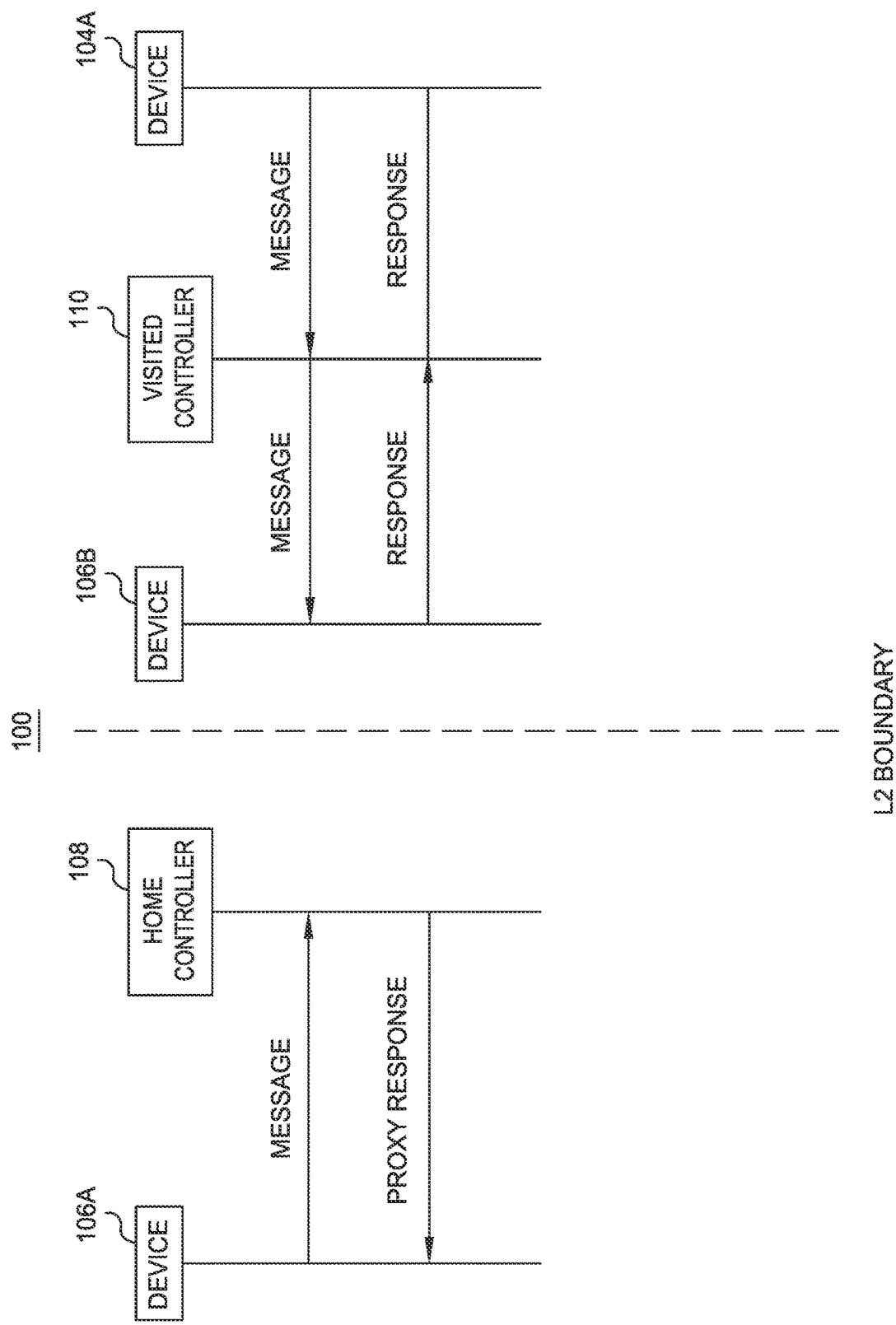
FIG. 2 illustrates an example message flow in the system of FIG. 1.

FIG. 2 illustrates an example message flow in the system 100 of FIG. 1. As seen in FIG. 2, the device 106A and the home controller 108 are in the home domain, and the visited controller 110 and the device 104A are in the visited domain. As discussed previously, the device 104A has roamed to the visited domain, but remains anchored to the home domain.

The device 106A communicates a message to the home controller 108. The message concerns the device 104A. For example, the message may be an NS Lookup command that is broadcasted by the device 106A. The NS Lookup command may include the home domain address of the device 104A. The device 106A may have broadcasted the NS Lookup command to determine whether any devices in the home domain are using the home domain address of the device 104A. If the device 104A is using the home domain address, then the device 106A expects a response from the device 104A to the NS Lookup command.

As another example, the message may be an Unreachability Detection command (NS NUD) that is communicated by the device 106A to determine whether the device 104A is still reachable within the home domain. The NS NUD may include the home domain address of the device 104A. If the device 104A is still reachable within the home domain, the device 106A expects a response from the device 104A to the NS NUD.

As another example, the message may be a Defend The Address (NS DAD) command communicated by the device 106A. The NS DAD may include the home domain address of the device 104A. The device 106A communicates the NS DAD to determine whether the home domain address may be assigned to another device. If the home domain address is currently being used, the device 106A expects a response from the device 104A indicating that the home domain address is being used and should not be assigned to another device.

Because the device 104A has roamed to the visited domain, the device 104A may not be able to respond to the message from the device 106A, which may result in the home domain address of the device 104A being assigned to another device. The home controller 108 receives the message from the device 106A and determines that the message concerns the device 104A. For example, the home controller 108 may use the home domain address in the message to reference the table 122. The home controller 108 may determine from the table 122 that the home domain address is assigned to the device 104A, which is anchored to the home domain. In response to determining that the device 104A uses the home domain address and is anchored to the home domain, the home controller 108 generates a proxy response and communicates the proxy response to the device 106A in place of the device 104A. When the device 106A receives the proxy response, the device 106A considers the proxy response as a response from the device 104A to the message. For example, if the message is an NS Lookup command, the proxy response may be an NA (non-override) message, and the device 106A considers the proxy response as a response from the device 104A indicating that the device 104A is using the home domain address in the NS Lookup command. As another example, if the message is an NS NUD, the proxy response may be aa NA (non-override) message, and the device 106A considers the proxy response as a response from the device 104A indicating that the device 104A is still reachable within the home domain. As another example, if the message is an NS DAD, the proxy response may be an NA (non-override) message, and the device 106A considers the proxy response as a response from the device 104A indicating that the home domain address should not be assigned to another device. In this manner, the home controller 108 preserves the home domain address of the device 104A within the home domain.

The device 104A defends its own home domain address in the visited domain. For example, if a device 106B in the visited domain communicates an NS DAD that includes the home domain address of the device 104A, the device 104A may receive the NS DAD from the visited controller 110. The device 104A then communicates an NA (non-override) message to the device 106B to indicate that the home domain address should not be assigned to another device in the visited domain. As another example, if the device 106B broadcasts an NS Lookup command that includes the home domain address of the device 104A, the device 104A may communicate an NA (non-override) message to the device 106B that indicates that the device 104A is using the home domain address. As another example, if the device 106B communicates an NS NUD that includes the home domain address of the device 104A, the device 104A communicates an NA (non-override) message that indicates that the device 104A is reachable in the visited domain. In this manner, the device 104A defends its own home domain address within the visited domain.

In certain embodiments, the device 104A communicates a message to discover other (non-networking) devices or services in the visited domain, such as printers. The message may include the device's 104A home domain address (e.g., the link local address of the device 104A in the home domain). The visited controller 110 receives the message and retains the message in the visited domain by communicating the message to a device 106B in the visited domain. The device 106B may be a printer. The device 106B responds to the message, and the visited controller 110 communicates the response to the device 104A. In this manner, the device 104A discovers other devices or services using link local messages in the visited domain.

Figure 3:
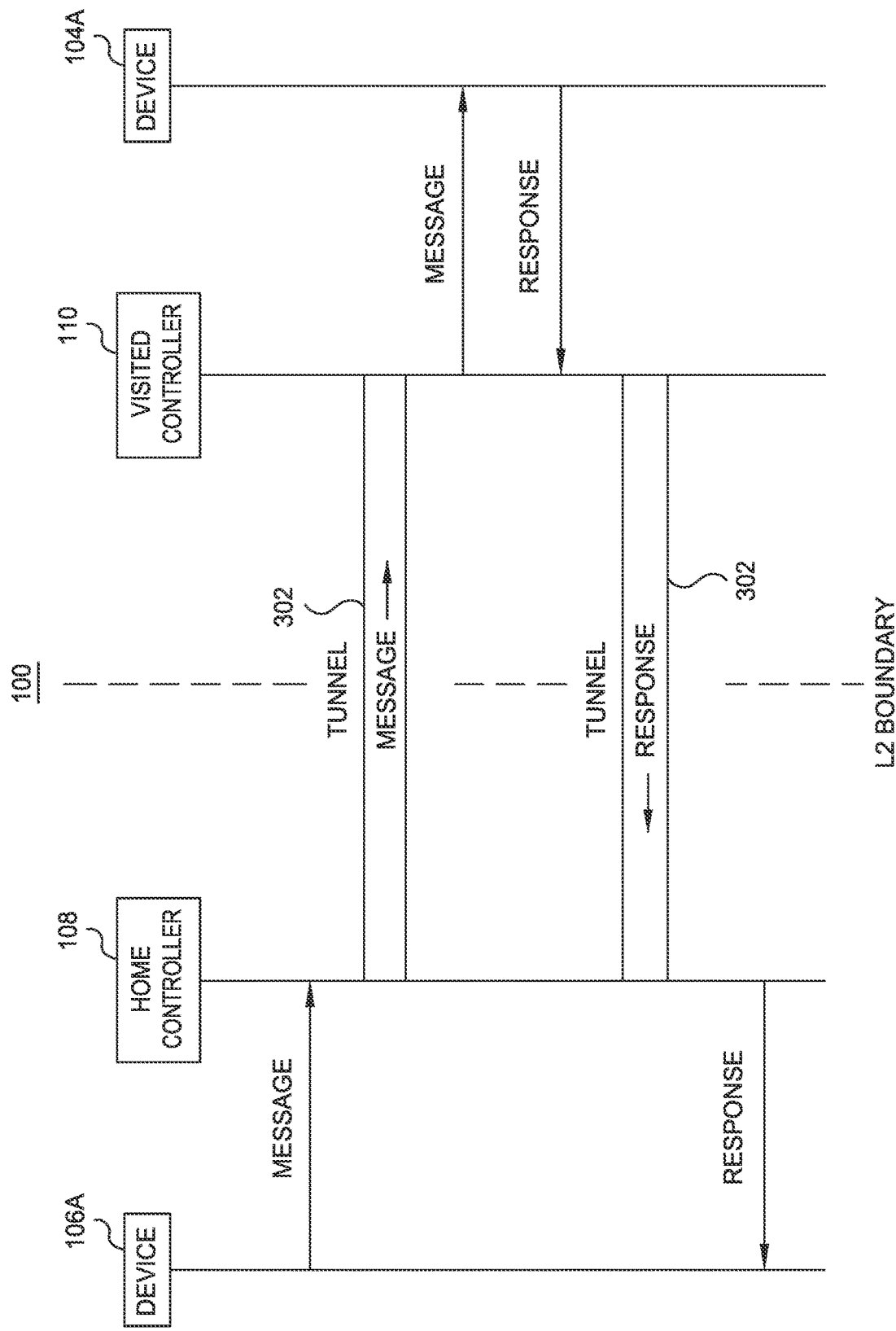
FIG. 3 illustrates an example message flow in the system of FIG. 1.

The home controller 108 and the visited controller 110 handle messages from certain predetermined network services (e.g., routers and DHCP relays) differently. FIG. 3 illustrates an example message flow in the system 100 of FIG. 1. In the example of FIG. 3, the device 106A is a router or a relay. The device 106A communicates a message to the home controller 108. For example, the message may be an NS Lookup command that includes the home domain address of the device 104A. As another example, the message may be an NS NUD or NS DAD that includes the home domain address of the device 104A.

The home controller 108 receives the message from the device 106A and determines that the device 106A is a router or relay. For example, the message may include information that identifies the device 106A as a router or a relay. As another example, the home controller 108 may reference the table 122 to determine if the device 106A is a router or relay. In response to determining that the device 106A is a router or relay and that the device 104A has roamed to the visited domain (e.g., by using information from a primary controller), the home controller 108 opens a tunnel 302 between the home controller 108 and the visited controller 110. The home controller 108 then communicates the message to the visited controller 110 through the tunnel 102. In this manner, the home controller 108 communicates the message across the level 2 boundary.

The visited controller 100 receives the message and communicates the message to the device 104A. The device 104A then generates a response and communicates the response to the visited controller 110. For example, the device 104A may generate an NA (non-override) message and communicate the NA (non-override) message to the visited controller 110. The visited controller 110 then communicates the response back to the home controller 108 through the tunnel 302. The home controller 108 then communicates the response to the device 106A. In this manner, the device 104A responds to the message communicated by the device 106A (e.g., to indicate to the device 106A that the device 104A is using the home domain address and/or that the device 104A is reachable).

Figure 4:
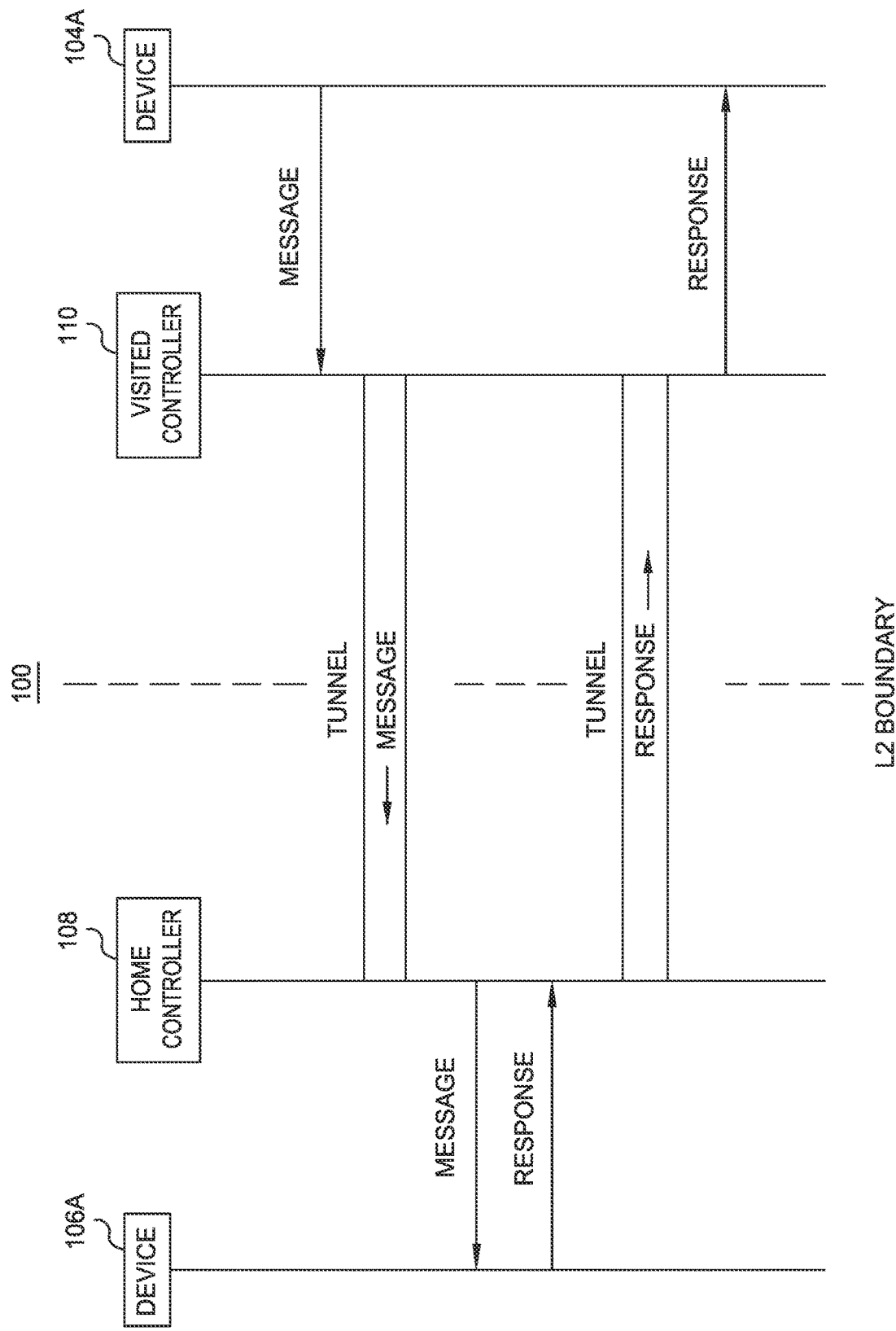
FIG. 4 illustrates an example message flow in the system of FIG. 1.

FIG. 4 illustrates an example message flow in the system 100 of FIG. 1. In the example of FIG. 4, the device 106A is a router or relay. The device 104A in the visited domain communicates a message intended for the device 106A. For example, the message may be a router solicitation (RS) message. As another example, the message may be an NS Lookup command that includes the home domain address of the device 106A.

The visited controller 110 receives the message from the device 104A and determines that the intended recipient of the message is a router or relay. For example, the message may include information that identifies the device 106A as a router or a relay. As another example, the visited controller 110 may reference the table 122 to determine if the device 106A is a router or relay. The visited controller 110 opens a tunnel 402 between the visited controller 110 and the home controller 108. The visited controller 110 then communicates the message through the tunnel 402 to the home controller 108. The home controller 108 then communicates the message to the device 106A.

The device 106A generates a response to the message and communicates the response to the home controller 108. For example, if the message was an RS message, the device 106A may generate a router advertisement (RA) message and communicate the RA message to the home controller 108. As another example, if the message is an NS Lookup command, the device 106A generates an NA (non-override) message and communicates the NA (non-override) command to the home controller 108. The home controller 108 communicates the response back to the visited controller 110 through the tunnel 402. The visited controller 110 then communicates the response to the device 104A.

In certain embodiments, the device 104A communicates a message that is intended for a device 106B in the visited domain. The device 106B may be a relay or a router. The message may include a global address of the device 106B. When the visited controller 110 receives the message from the device 104A, the visited controller 110 may determine that the message includes a global address and may open the tunnel 402 to the home controller 108. The visited controller 110 then communicates the message to the home controller 108 through the tunnel 402. The home controller 108 then determines that the message includes a global address and should be sent to the router 112. The home controller 108 communicates the message to the router 112. The router 112 then determines that the device 106B is in the visited domain and communicates the message to the visited controller 110. The visited controller 110 then communicates the message to the device 106B in the visited domain.

In some embodiments, the home controller 108 communicates a message with the global address of the device 104A through the tunnel 402. For example, if the home controller 108 receives a message that includes the global address of the device 104A, the home controller 108 may determine from the table 122 that the global address belongs to the device 104A, which is in the visited domain. The home controller 108 opens the tunnel 402 to the visited controller 110 and communicates the message through the tunnel 402 to the visited controller 110. The visited controller 110 then communicates the message to the device 104A.

Figure 5:
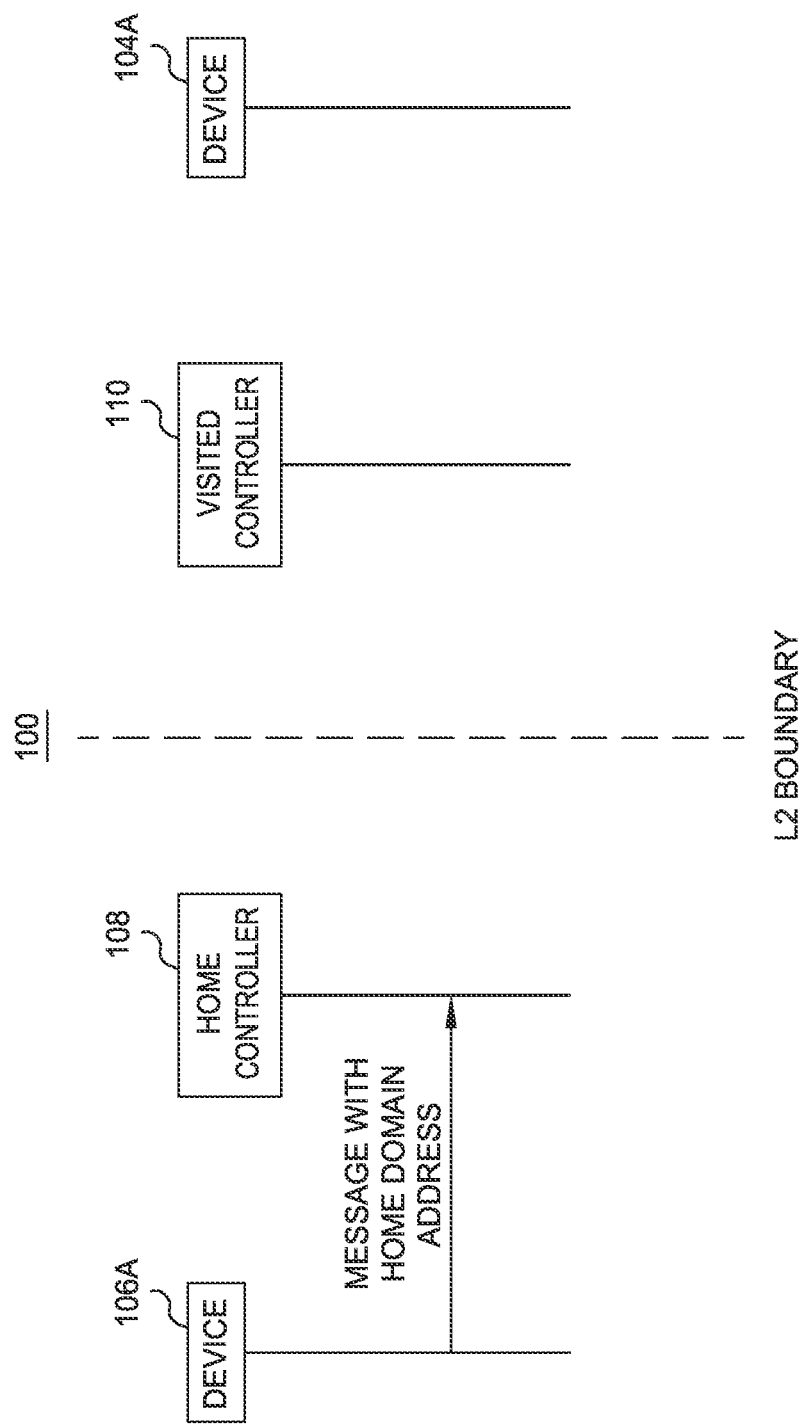
FIG. 5 illustrates an example message flow in the system of FIG. 1.

FIG. 5 illustrates an example message flow in the system 100 of FIG. 1. In the example of FIG. 5, the device 106A is in the home domain and communicates a message with the home domain address of the device 104A. The device 104A is in the visited domain. The home controller 108 receives the message and determines that the message does not concern the overriding or assignment of the home domain address of the device 104A. For example, the home controller 108 may determine that the message is not an NS Lookup command, an NS NUD, or an NS DAD. In response, the home controller 108 ignores the message. The device 106A may wait for the response to the message until a timeout is reached.

Figure 6:
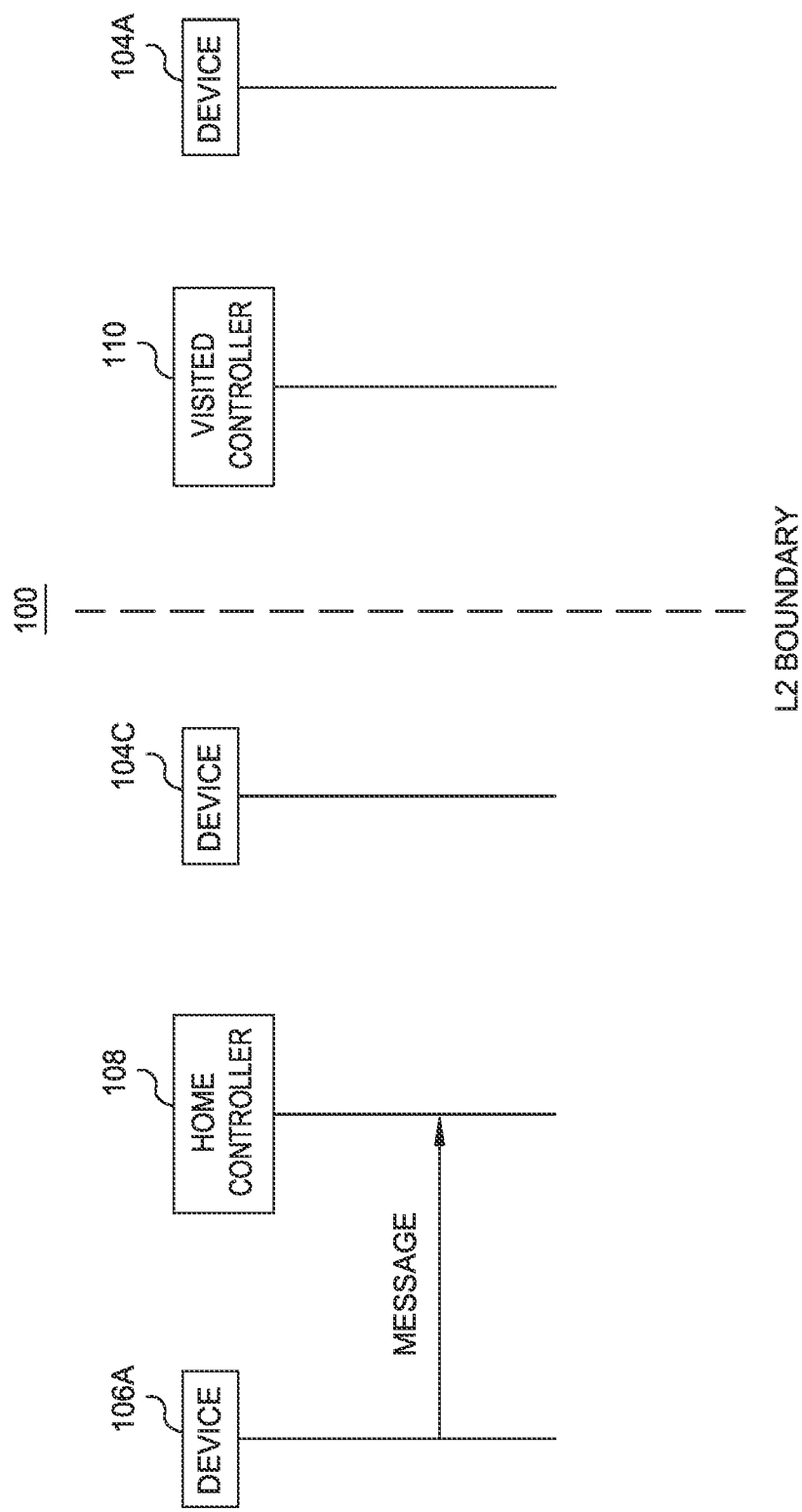
FIG. 6 illustrates an example message flow in the system of FIG. 1.

FIG. 6 illustrates an example message flow in the system 100 of FIG. 1. As seen in FIG. 6, the device 104C that was in the visited domain has roamed to the home domain and is connected to the home controller 108. The device 106A is a router or relay. The device 106A communicates a message that includes a visited domain address of the device 104C (e.g., a link local address of the device 104C in the visited domain). The home controller 108 receives the message and determines that the message includes the visited domain address of the device 104C. In response, the home controller 108 blocks the message from being communicated to the device 104C. Alternatively or additionally, if the device 104C communicates a message that includes the home domain address of the device 106A, the home controller 108 also blocks that message. In this manner, the home controller 108 prevents the device 104C that is anchored in a different domain from interacting with certain predetermined network services (e.g., routers and DHCP relays) in the home domain when connected to the home domain.

Figure 7:
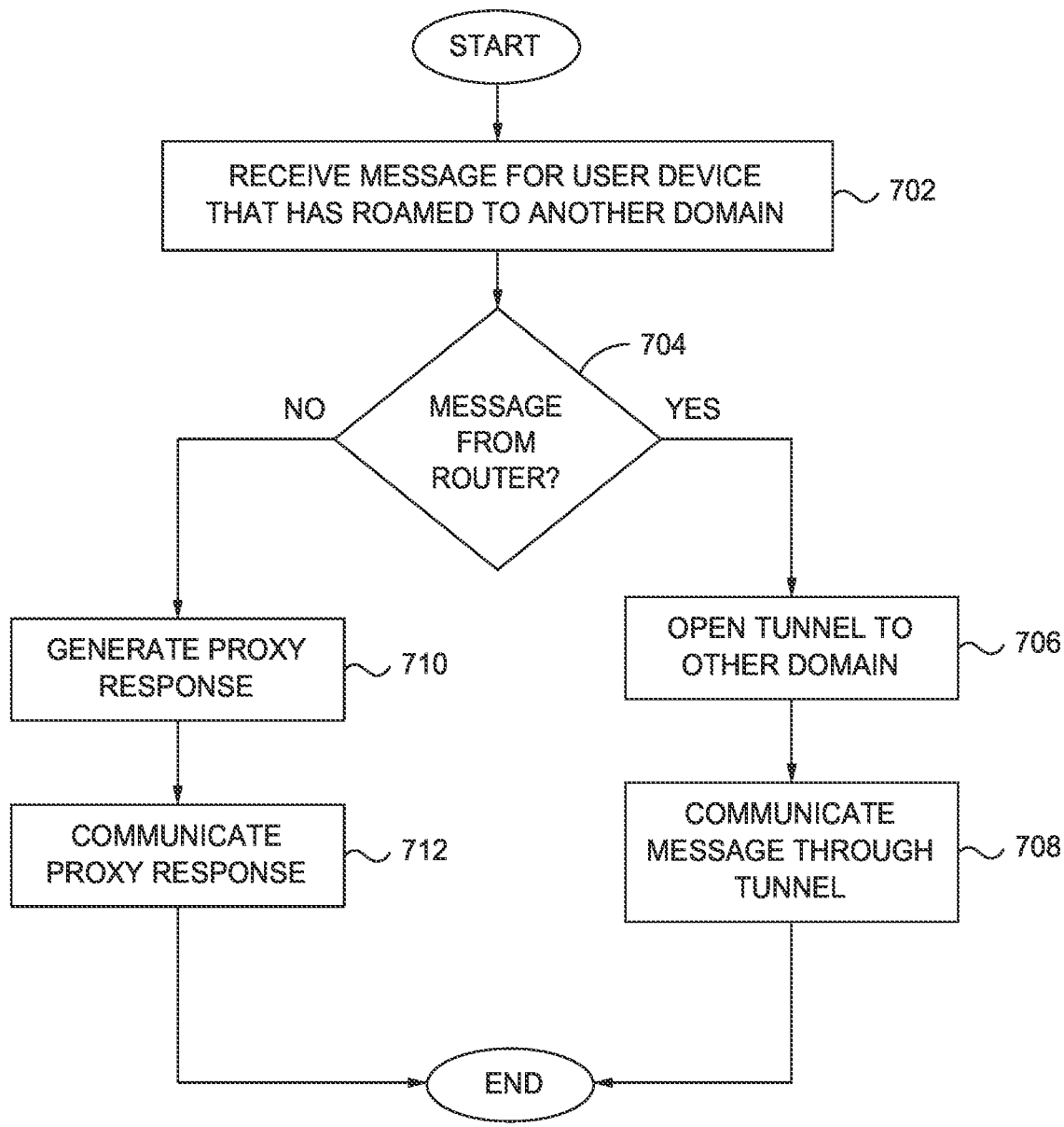
FIG. 7 is a flowchart of an example method performed in the system of FIG. 1.

FIG. 7 is a flowchart of an example method 700 performed in the system 100 of FIG. 1. The home controller 108 may perform the method 700. In particular embodiments, by performing the method 700, the home controller 108 prevents a home domain address of a device 104 from being overwritten, even after the device 104 has roamed to a visited domain.

In block 702, the home controller 108 receives, from a device 106, a message for the device 104 that has roamed to another domain, such as the visited domain. The message may concern the home domain address of the device 104. For example, the message may be an NS Lookup command, an NS NUD or an NS DAD that includes the home domain address of the device 104. If a response is not provided to the message, the home domain address of the device 104 may be overwritten or assigned to another device.

In block 704, the home controller 108 determines whether the device 106 is a router. In some embodiments, the home controller 108 determines whether the device 106 is a relay. If the message is from a router, the home controller 108 proceeds to the block 706 to open a tunnel to the visited domain. The home controller 108 then communicates the message through the tunnel in block 708. When the message reaches the visited domain, a visited controller 110 in that domain communicates the message to the device 104. The device 104 may then generate a response and communicate the response to the home controller 108 through the tunnel. The home controller 108 then communicates the response to the router.

If the device 106 is not a router, the home controller 108 proceeds to block 710 to generate a proxy response. The proxy response is a response that the home controller 108 generates in place of the device 104. The response may be an NA (non-override) message. The home controller 108 communicates the proxy response to the device 106 in block 712. By the home controller 108 communicating the proxy response in place of the device 104, the home controller 108 indicates to the device 106 that the home domain address of the device 104 is in use and/or that the device 104 is reachable within the home domain. As a result, the home domain controller 108 defends the home domain address of the device 104 even if the device 104 has roamed to another domain.

Figure 8:
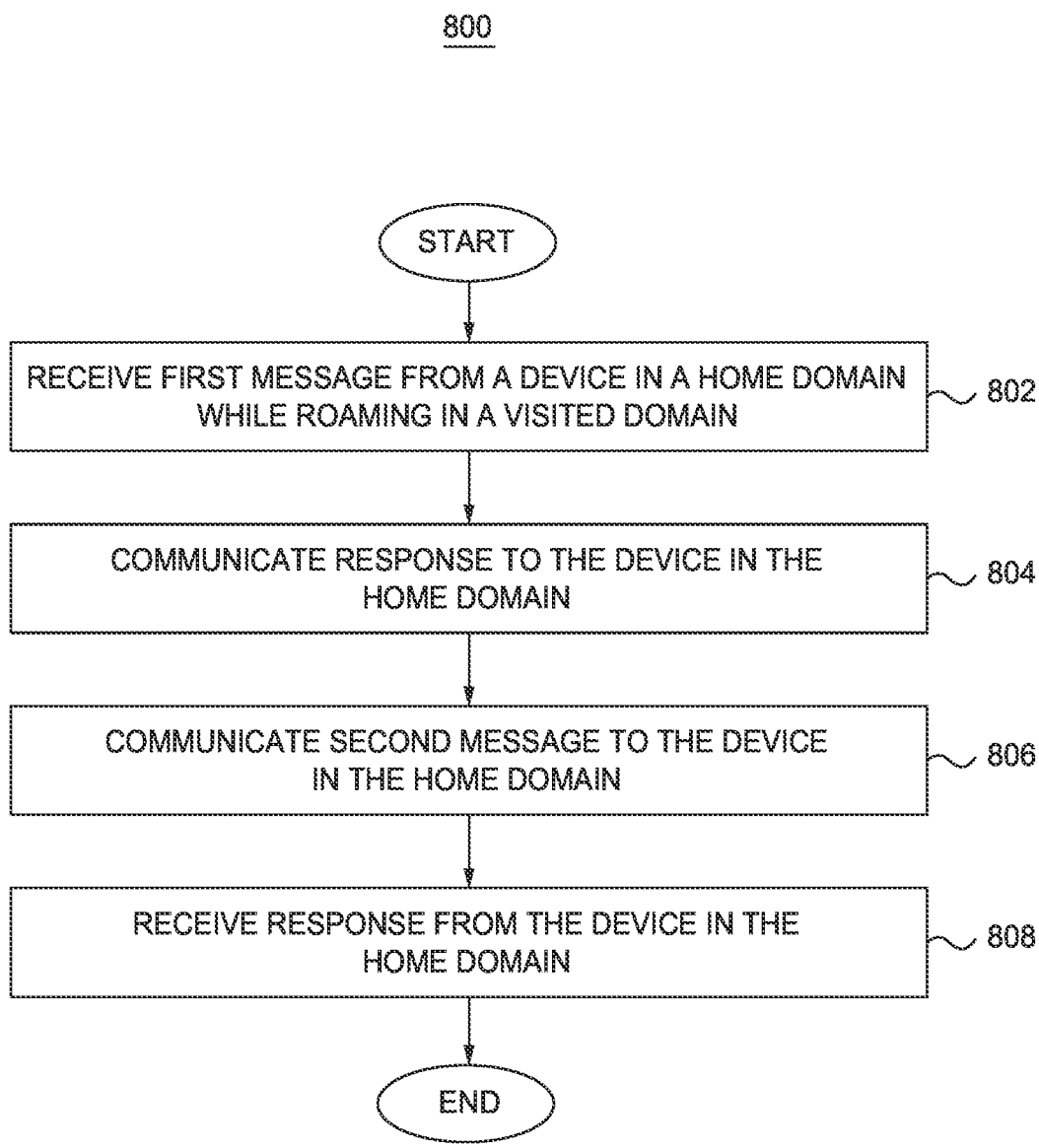
FIG. 8 is a flowchart of an example method performed in the system of FIG. 1.

FIG. 8 is a flowchart of an example method 800 performed in the system 100 of FIG. 1. A device 104 performs the method 800. In particular embodiments, by performing the method 800, the device 104 communicates with a router in a home domain even after the device has roamed to a visited domain.

The method 800 may be performed after the blocks 706 and 708 in FIG. 7 in which the home controller 108 opens a communication tunnel to the visited domain and communicates a first message from a device 16 (e.g., a router or relay) through the tunnel to a device 104 in the visited domain. A visited controller 110 in the visited domain receives the first message through the tunnel and communicates the first message to the device 104. In block 802, the device 104 in the visited domain receives the first message from the visited controller 110. In block 804, the device 104 communicates a response to the first message to the device 106 in the home domain. The device 104 communicates the response to the visited controller 110. The visited controller 110 then communicates the response to the home controller 108 through the tunnel. The home controller 108 then communicates the response to the device 106.

In block 806, the device 104 communicates a second message to the device 106 in the home domain. The device 104 communicates the second message to the visited controller 110. The visited controller 110 then communicates the second message to the home controller 108 through the tunnel. The home controller 108 then communicates the second message to the device 106. The device 106 receives the second message and generates a response to the second message. The device 106 then communicates the response to the second message to the home controller 108. The home controller 108 then communicates the response to the second message through the tunnel to the visited controller 110. The visited controller 110 then communicates the response to the second message to the device 104. In block 808, the device 104 receives the response to the second message from the visited controller 110. In this manner, the device 104 communicates with a device 106 (e.g., a router or relay) in the home domain even though the device 104 is in a visited domain.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method comprising:
receiving, at a home controller of a home domain and from a first device in the home domain, a first message concerning a user device that is anchored to the home domain and that has roamed from the home domain to a visited domain;
determining, by the home controller, that the first device is a router;
in response to the home controller determining that the first device is a router:
opening a tunnel between the home controller and a visited controller of the visited domain; and communicating the first message to the user device in the visited domain through the tunnel and the visited controller;

receiving, at the home controller, a second message broadcasted by a second device in the home domain, wherein the second message concerns the user device;

determining, by the home controller, that the second device is not a router; and in response to the home controller determining that the second device is not a router:

generating, at the home controller, a response to the second message; and communicating, from the home controller to the second device, the response to the second message as a proxy for the user device in the visited domain.

2. The method of claim 1, further comprising:

receiving, at the home controller and from the second device, a third message comprising a home domain address of the user device; and ignoring the third message.

3. The method of claim 1, further comprising:

receiving, through the tunnel and from the user device, a response to the first message; and communicating the response to the first message.

4. The method of claim 1, further comprising anchoring the user device to the home domain by storing a home domain address and a global address of the user device in a table.

5. The method of claim 1, further comprising:

receiving, from the first device, a third message for a second user device that is anchored to the visited domain and that has roamed from the visited domain to the home domain; and blocking the third message.

6. The method of claim 1, wherein the response to the second message prevents the second device from taking one of a global address or a home domain address of the user device.

7. The method of claim 1, wherein the response to the second message indicates to the second device that the user device is reachable in the home domain.

8. The method of claim 1, wherein the response to the second message defends a link local address of the user device so that the link local address is not overwritten in the home domain.

9. A home controller comprising:

a memory; and a hardware processor communicatively coupled to the memory, the hardware processor configured to:

receive, from a first device in a home domain, a first message concerning a user device that is anchored to the home domain and that has roamed from the home domain to a visited domain;

determine that the first device is a router;

in response to determining that the first device is a router:

open a tunnel between the home controller and a visited controller of the visited domain; and communicate the first message to the user device in the visited domain through the tunnel and the visited controller;

receive a second message broadcasted by a second device in the home domain, wherein the second message concerns the user device;

determine that the second device is not a router; and in response to determining that the second device is not a router:

generate a response to the second message; and communicate, to the second device, the response to the second message as a proxy for the user device in the visited domain.

10. The home controller of claim 9, the hardware processor further configured to:

receive, from the second device, a third message comprising a home domain address of the user device; and ignore the third message.

11. The home controller of claim 9, the hardware processor further configured to:

receive, through the tunnel and from the user device, a response to the first message; and communicate the response to the first message.

12. The home controller of claim 9, the hardware processor further configured to anchor the user device to the home domain by storing a home domain address and a global address of the user device in a table.

13. The home controller of claim 9, the hardware processor further configured to:

receive, from the first device, a third message for a second user device that is anchored to the visited domain and that has roamed from the visited domain to the home domain; and block the third message.

14. The home controller of claim 9, wherein the response to the second message prevents the second device from taking one of a global address or a home domain address of the user device.

15. The home controller of claim 9, wherein the response to the second message indicates to the second device that the user device is reachable in the home domain.

16. The home controller of claim 9, wherein the response to the second message defends a link local address of the user device so that the link local address is not overwritten in the home domain.

17. A method comprising:

in a first device roaming in a visited domain, receiving a first message from a second device in a home domain; and communicating, to the second device, a response to the first message, wherein the first message and the response are communicated through a tunnel between a controller in the visited domain and a controller in the home domain, wherein the tunnel is opened by the controller in the home domain in response to the controller in the home domain determining that the second device is a router, and wherein the controller in the home domain generates a response to a second message as a proxy for the first device in response to the controller in the home domain determining that a third device that broadcasted the second message in the home domain is not a router.

* * * * *